United States Patent [19]
Pratt et al.

[11] Patent Number: 4,747,204
[45] Date of Patent: May 31, 1988

[54] METHOD OF INSTALLING DRIVE NUT BLIND FASTENERS WITH CAP NUTS

[75] Inventors: John D. Pratt, Rancho Cucamonga; Victor Belanger, Huntington Beach, both of Calif.

[73] Assignee: Monogram Industries, Inc., Culver City, Calif.

[21] Appl. No.: 26,984

[22] Filed: May 22, 1987

Related U.S. Application Data

[62] Division of Ser. No. 784,348, Oct. 4, 1985, Pat. No. 4,681,494.

[51] Int. Cl.⁴ .................... B21D 39/00; B23D 11/02
[52] U.S. Cl. ................................ 29/523; 29/526 R
[58] Field of Search ................... 29/523, 526 R; 81/124.4, 125; 411/43, 39, 54, 1, 34, 36, 37, 38

[56] References Cited

U.S. PATENT DOCUMENTS

| | | | |
|---|---|---|---|
| 2,099,678 | 11/1937 | Curtis | 411/54 |
| 2,392,133 | 1/1946 | Eklund | 411/43 |
| 2,765,699 | 10/1956 | LaTorre | 411/43 |
| 3,236,143 | 2/1966 | Wing | |
| 3,262,353 | 7/1966 | Waeltz et al. | 411/39 |
| 3,276,308 | 10/1966 | Bergere | 411/43 |
| 3,434,262 | 3/1969 | Lawrence | 411/54 |
| 3,657,956 | 4/1972 | Bradley et al. | 411/43 |
| 4,041,833 | 8/1977 | Wagner | 411/372 |
| 4,295,761 | 10/1981 | Hansen | 411/1 |
| 4,367,994 | 1/1983 | Francis et al. | 411/43 |
| 4,370,081 | 1/1983 | Briles | 411/43 |
| 4,659,271 | 4/1987 | Pratt et al. | 411/43 |

FOREIGN PATENT DOCUMENTS

| | | | |
|---|---|---|---|
| 3325618 | 1/1984 | Fed. Rep. of Germany | |
| 3440519 | 11/1984 | Fed. Rep. of Germany | |
| 1092331 | 11/1967 | United Kingdom | 29/526 R |
| 1279957 | 4/1971 | United Kingdom | |
| 1490508 | 4/1976 | United Kingdom | |
| 2113791 | 8/1983 | United Kingdom | 411/43 |
| 259565 | 4/1970 | U.S.S.R. | 411/43 |

Primary Examiner—Charlie T. Moon
Attorney, Agent, or Firm—Pretty, Schroeder, Brueggemann & Clark

[57] ABSTRACT

A blind fastener is provided for connecting two workpieces together, comprising an internally threaded fastener body and an externally threaded stem passing in threaded engagement therewith. A drive nut is mounted on the stem in contact with the fastener body for preventing rotation thereof upon turning of the stem to install the fastener. The outer end of the stem has a cap nut to enable turning of the stem. Both the drive nut and cap nut are engaged by wrench components of an installation tool to cause turning motion of the stem relative to the fastener body to deform a sleeve around the fastener body into contact with one surface of the two workpieces. Although the fastener may vary in size depending upon the nature of the two workpieces to be connected together, the outer dimensions of the drive nut and cap nut remain constant for all fasteners regardless of differing stem diameters of different size fasteners. This enables setting fasteners of different stem diameters without necessity to change the wrench components of the installation tool. The outer surface of the drive nut and cap nut may be hexagonal or cylindrical in configuration for use with either hand held or robotic installation tools.

10 Claims, 1 Drawing Sheet

METHOD OF INSTALLING DRIVE NUT BLIND FASTENERS WITH CAP NUTS

This is a division of application Ser. No. 784,348, filed Oct. 4, 1985, now U.S. Pat. No. 4,681,494.

BACKGROUND OF THE INVENTION

This invention relates generally to blind fasteners and to a method of enabling setting of different size fasteners without necessity to change the wrench bits of the installation tool.

Blind fasteners commonly are used to join two workpieces together. One type of blind fastener generally comprises an internally threaded fastener body for insertion into aligned holes of the two workpieces, and an externally threaded cylindrical stem passing in threaded engagement through the fastener body. The inserted end of the stem has an enlarged stem head, and the outer end of the stem has a wrench engaging portion. Upon turning motion of the stem relative to the fastener body, the stem is moved in an axial outward direction through the fastener body. This axial outward movement causes a deformable sleeve around the stem and abutting against the stem head to deform around the fastener body to a fully set condition against the inner workpiece. The stem further may be provided with a localized weakened region or break groove adapted to shear the stem at a predetermined torque. The break groove preferably is locatd axially along the stem such that the stem shears in substantially flush relation to the outer portion of the fastener body, i.e., the fastener body head. The fastener body head normally is received in a countersunk, flush relationship to the outer workpiece, thus providing an aerodynamic surface after the fastener is set.

As the stem is turned through the fastener body, some means must be provided for preventing rotation of the fastener body inside the workpieces. One approach comprises providing a plurality of notches in the fastener body head for engagement by an installation tool having a non-rotating nosepiece fitting that is inserted into the notches. The fitting holds the fastener body against rotation, while a rotary wrench bit of the installation tool fits over the wrench engaging region and turns the stem through the fastener body. Another more recent approach, disclosed in copending application Ser. No. 583,029, involves mounting an internally threaded drive nut, such as a hex nut, on the stem in abutment with the outer surface of the fastener body head. The drive nut is held stationary by an appropriately configured fitting on the installation tool. The drive nut creates a frictional resistance for resisting turning slippage between abutting surfaces of the drive nut and the fastener body head during turning motion of the stem by the rotary wrench bit.

It is known that the size of the fastener used to connect the two workpieces varies depending upon several factors, such as the size and composition of the two workpieces. For example, heavy, thick workpieces generally require a larger size fastener than lightweight, thin workpieces. Therefore, as the size and composition of the workpieces varies, so does the size of the fastener. This includes variations in the dimensions of the fastener body, stem and drive nut. To install fasteners of different sizes, therefore, requires an installation tool having a different size nosepiece fitting and a different size rotary wrench bit for each size fastener. When various size fasteners are being installed in a particular work area, which is not uncommon when assembling structural members, for example, of an aircraft, the installer constantly may be required to use several installation tools, each one having a fitting and a wrench bit dimensioned for a particular size fastener. If access to several tools is not possible, the installer frequently may be required to change the fittings and wrench bits of the installation tool. This is time consuming and inconvenient.

If robotic installation of the fastener is contemplated, the time consuming problem of having to manually change components of the installation tool tends to undermine the reason for using robotic installation in the first place. Another related problem associated with robotic installation is that it may be difficult for the robotic installation tool to align with and engage the drive nut and wrench engaging region of the stem. This also is a consideration when using hand held installation tools. Most drive nuts are hexagonal in cross-section, while the wrench engaging region of most stems comprises wrenching flats. Depending upon the sophistication and mechanical capabilities of the robotic installation tool, the tool may not permit sufficient rotational adjustment of the nosepiece fitting and rotary wrench bit to align with and fit over the drive nut and wrenching flats, respectively. This poses additional time consuming problems and inconvenience.

Accordingly, there has existed a definite need for a blind fastener that despite its variation in size, may be installed by manual or robotic installation tools without having to change the wrench components of the tools each time a fastener of differing size is used. There further has existed a definite need for a method of installing blind fasteners of different sizes without necessity to change the wrench components of the installation tool. The present invention satisfies these needs and provides further related advantages.

SUMMARY OF THE INVENTION

The present invention provides a blind fastener for connecting two workpieces together in overlapped outer and inner relation. The wrench engaging surfaces of the fastener have a constant outer dimension, regardless of variations in the size of the fastener, for engaging corresponding wrench components of an installation tool. This advantageously allows installation of different size fasteners without necessity to change the wrench components of the tool each time a different size fastener is to be installed. The fastener of the present invention furthermore is simple to install, reliable in use and relatively inexpensive to manufacture.

The fastener comprises an internally threaded fastener body received within aligned openings in the two workpieces, and an externally threaded stem passing in threaded engagement therethrough. The fastener body has a tapered nose projecting inwardly beyond the inner workpiece and an enlarged body head received in a substantially flush, countersunk relation within the outer workpiece. The stem has an enlarged stem head at the inserted or inner end of the stem for contact with a deformable sleeve around the stem. Turning motion of the stem in one direction relative to the fastener body moves the stem in an axial outward direction through the fastener body and deforms the sleeve over the tapered nose and against the inner workpiece.

To enable turning of the stem, a cap nut is mounted on the outer end of the stem. The cap nut has an outer surface for engagement with a rotary wrench bit of an installation tool and an inner surface for connection to the stem. To prevent turning of the fastener body within the workpiece while the stem is being turned, a drive nut is mounted on the stem in abutment with the fastener body head. The drive nut has an outer surface for engagement with a non-rotating fitting of the installation tool, and an internally threaded inner surface for threaded mounting on the stem. To install the fastener, the installation tool is moved axially onto the fastener, with the non-rotating fitting engaging the drive nut and preventing turning of it and the fastener body, and with the rotary wrench bit engaging the cap nut and turning it and the stem in the one direction to set the fastener.

In various uses of the blind fastener described above, the thickness and composition of the workpieces may be different, thus requiring selection of a fastener of appropriate size to provide a suitable clamping function. Fasteners of different size, of course, have different dimensions, including a different stem diameter. In accordance with the present invention, the drive nut and cap nut each advantageously have outer surface dimensions which are constant for all fasteners, regardless of the dimensions of different size fasteners. That is, the inner surface dimensions of the drive nut and cap nut vary with the stem diameter of different size fasteners, while the outer surface dimensions remain constant for engagement with the installation tool. These constant outer surface dimensions of the drive nut and cap nut advantageously enable use of only a single installation tool to install various sized fasteners. Thus, constant changing of the non-rotating fitting and rotary wrench bit of the installation tool is avoided, as is the need to switch from various installation tools each equipped with a different size fitting and wrench bit corresponding to a particular fastener size. This results in major savings in both installation time and expense.

In one aspect of the invention, the drive nut and cap nut are non-cylindrical in configuration and may comprise, for example, hex nuts, with the installation tool having a correspondingly configured fitting and wrench bit. This non-cylindrical or hex nut configuration is most commonly used when installing the fasteners with hand held installation tools. In another aspect of the invention, the drive nut and cap nut each have cylindrical outer surfaces for engagement by an installation tool having a cylindrically shaped fitting and wrench bit. This cylindrical nut configuration is particularly suited for use with robotic installation tools, as the cylindrical configuration of the drive nut and cap nut eliminates the need for rotational adjustment of the fitting and wrench bit to align with the drive nut and cap nut. This cylindrical configuration greatly facilitates robotic installation of fasteners and, if desired, also may be used in conjunction with hand held installation tools as well.

Assembled fasteners having the structure described above provide an efficient method of installing them by either hand held or robotic installation tools. The method comprises the steps of providing outer dimensions on the cap nut and drive nut of each fastener which are constant for all of the fasteners, regardless of the different diameter of the stem upon which they are mounted. The rotary wrench bit and non-rotating fitting are then successively moved onto and off the cap nut and drive nut of each fastener to install the fasteners without necessity to change the fitting and wrench bit each time a different size fastener is to be installed.

Other features and advantages of the present invention will become apparent from the following detailed description taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, the present invention is embodied in a blind fastener, for use in connecting two workpieces together in overlapped outer and inner relation. The wrench engaging surfaces of the fastener advantageously have a constant outer dimension, regardless of variations in the size of the fastener, to permit installation of different size fasteners by the same installation tool without necessity to change the wrench bits of the tool. The blind fastener of the present invention furthermore is simple to install, reliable in use and relatively inexpensive to manufacture.

Figure 1:
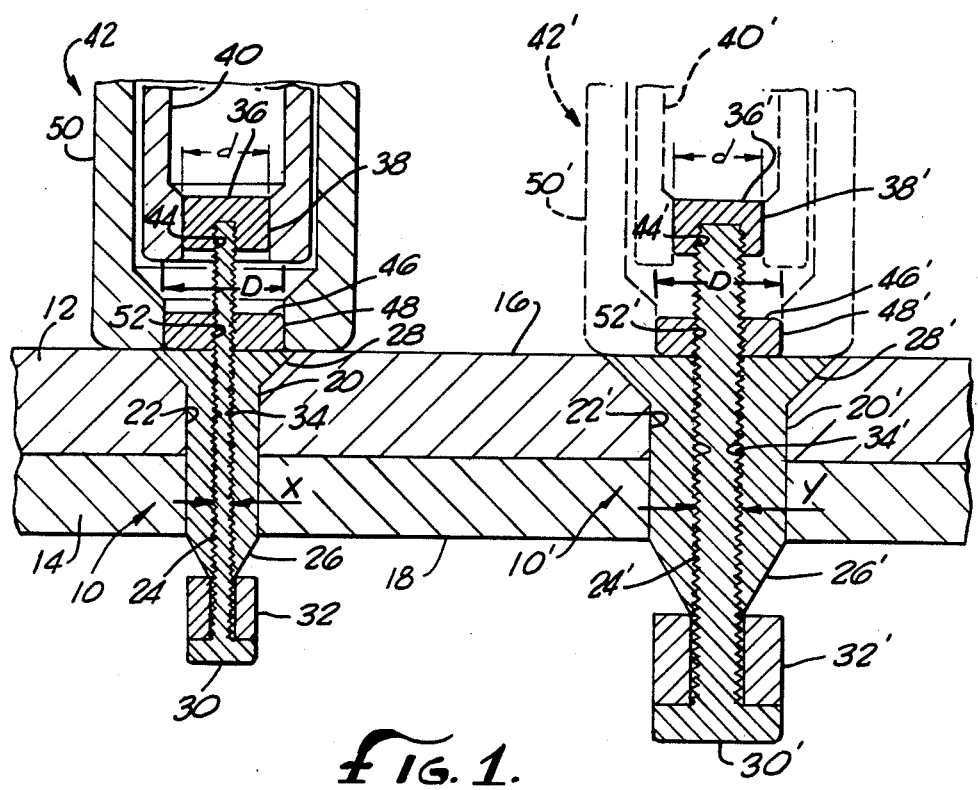
FIG. 1 is a cross-sectional view of two blind fasteners embodying the novel features of the invention, illustrating the fasteners in an unset condition and having drive nuts and cap nuts with constant outer dimensions, regardless of their different stem diameters, for engagement by an installation tool.

Referring to FIG. 1, two blind fasteners 10 and 10' of the present invention are shown for connecting two workpieces 12 and 14 together in overlapped outer and inner relation, with the outer workpiece 12 having an accessible outer surface 16 and the inner workpiece 14 having an inaccessible or blind inner surface 18. For purposes of convenience, the fastener 10 on the left side of FIG. 1 will be referred to and described, although it should be understood that the same description equally applies to the fastener on the right side of FIG. 1, unless otherwise indicated.

The fasteners each comprise an internally threaded, generally tubular fastener body 20 received within aligned openings 22 in the two workpieces, and an externally threaded cylindrical stem 24 passing in threaded engagement through the fastener body. The fastener body has a tapered nose 26 projecting inwardly beyond the inner surface of the inner workpiece, and an enlarged body head 28 received in a substantially flush, countersunk relationship to the outer surfce of the outer workpiece. The stem has an enlarged head 30 at its inserted or inner end for abutment with a substantially cylindrical, deformable sleeve 32. The outer dimensions of the fastener body, stem head and sleeve are substantially the same, but are slightly less than the diameters of the holes in the two workpieces. This sizing of the fastener permits insertion of the fastener through the holes in the two workpieces to enable the fastener to perform its clamping function on the blind side, as explained in more detail below.

To set the fastener 10 and clamp the two workpieces 12 and 14 together, the stem 24 is turned in one direction relative to the fastener body 20. This turning motion causes the stem to move in an axial outward direction through the fastener body. As the stem is moved axially outwardly, the stem head 30 forces the deformable sleeve 32 into engagement with the tapered nose 26 and over the fastener body. After the stem has been moved axially a certain distance, the sleeve will be fully set against the inner surface 18 of the inner workpiece 14 forming a secure connection between the two workpieces. If desired, a localized weakened region or break groove 34 may be provided at an axial location along the stem and adapted to shear the stem at a point flush with the fastener body head 28.

Turning of the stem 24 relative to the fastener body 20 to set the fastener 10 accomplished preferably by applying a torque to the stem while holding the fastener body against rotational movement. Various conventional hand held power driven installation tools having wrench bits, may be used for setting and installing the fasteners in the manner described above.

In accordance with the present invention, a cap nut 36 is mounted on the outer end of the stem 24 and has an outer surface 38 for engaging a rotary wrench bit 40 of an installation tool 42. The cap nut has an inner surface 44 fixedly mounted to the stem such that engagement and turning of the cap nut by the wrench bit also turns the stem. To prevent turning of the fastener body 20 within the workpieces 12 and 14 while the stem is being turned, a drive nut 46 is mounted on the stem in abutment with the fastener body head 28. Frictional and/or mechanical resistance between abutting surfaces of the drive nut and the fastener body head resists turning slippage of the fastener body head relative to the drive nut. The drive nut has an outer surface 48 for engagement by a non-rotating fitting 50 on the installation tool and an inner surface 52 that is threaded for engagement with the externally threaded stem. The non-rotating fitting is concentric with but axially spaced from the rotating wrench bit and holds the drive nut and thus the fastener body against rotation relative to the stem.

To install the fastener 10 of the present invention, the installation tool 42 is moved axially onto the fastener, with the non-rotating fitting engaging the drive nut 46 and holding it and the fastener body 20 against rotation, and with the rotary wrench bit 40 engaging the cap nut 36 and turning it and the stem 24 in a direction to set the fastener. To enable the axial movement of the installation tool onto and off the fastener, the outer dimensions of the drive nut may be greater than the outer dimensions of the cap nut.

While the dimensions of the two fasteners 10 and 10' illustrated in FIG. 1 may vary, the outer surfaces 38 and 48 of the cap nut 36 and drive nut 46 each are provided with constant dimensions, regardless of the diameters of the stems upon which they are mounted. As shown in FIG. 1, the drive nuts 46 and 46' of the two blind fasteners 10 and 10' illustrated each have the same outer dimensions D, while the diameters of the two stems 24 and 24' have different dimensions X and Y, respectively, with the dimension X being smaller than the dimension Y for purposes of illustration. Similarly, the cap nuts 36 and 36' of the two blind fasteners each have the same outer dimension d, despite the fact that the stems each have different dimensions as noted above.

It will be appreciated that the dimensions of the inner surfaces 44 and 52 of the cap nut 36 and drive nut 46 will vary to correspond to the different diameters of the stems upon which they are mounted, while the dimensions of the outer surfaces 38 and 48 remain constant. These constant outer surface dimensions of the drive nut and cap nut advantageously enable use of a single installation tool 42 to install fasteners of various sizes, without necessity to change the non-rotating fitting 50 and rotary wrench bit 40 of the tool. Thus, changing of the fitting and wrench bit of the installation tool is avoided completely, as is the need to use more than one installation tool should each tool be equipped with a different size fitting and wrench bit corresponding to a particular fastener size. The ability to use a single installation tool to install fasteners of various sizes enhances installation efficiency by significantly reducing the overall time and expense involved in installing the fasteners.

Figure 2:
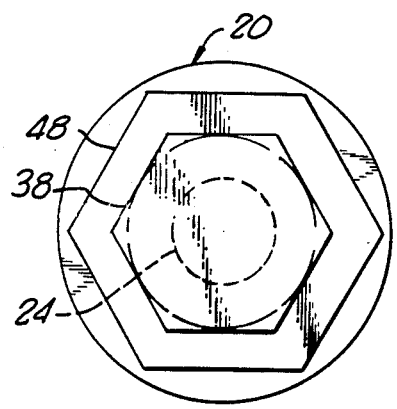
FIG. 2 is a plan view of one of the fasteners of FIG. 1, showing the outer surfaces of the drive nut and cap nut as having a non-cylindrical, hexagonal configuration.
Figure 3:
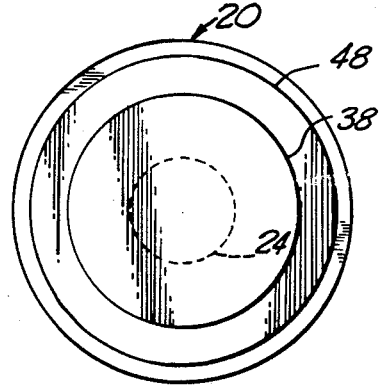
FIG. 3 is a plan view substantially similar to that of FIG. 2, showing the outer surfaces of the drive nut and cap nut as having a cylindrical configuration particularly suited for engagement by robotic installation tools.

In many cases, the fastener 10 may be installed by utilizing a hand-held, power driven installation tool. Othertimes, it may be desirable to install the fastener by automated or robotic installation tools. In either situation, the configuration of the outer surfaces 38 and 48 of the cap nut 36 and drive nut 46 may be selected to facilitate installation of the fastener. For example, if manual installation is contemplated, the outer surface configuration of the drive nut and cap nut may be non-cylindrical, for example, hexagonal, as shown in FIG. 2. The fitting 50 and wrench bit 40 of the installation tool 42, of course, would have a corresponding non-cylindrically or hexagonally shaped surface for engaging the drive nut and cap nut respectively. On the other hand, if robotic installation of the fastener is contemplated, the outer surface configuration of the drive nut and cap nut may be cylindrical, as shown in FIG. 3, with the fitting and wrench bit of the installation tool having a corresponding cylindrical shaped engagement surface.

One suitable installation tool having cylindrical shaped engagement surfaces is shown, for example, in copending U.S. patent application Ser. No. 717,949, now abandoned. These cylindrical shaped engagement surfaces easily align with and then securely grab the drive nut or cap nut to set the fastener. This advantageously eliminates the need for rotational adjustment of the fitting and wrench bit to align with the drive nut and cap nut and greatly increases the speed at which the fasteners can be installed. It is understood that hand held installation tools also can be provided with the cylindrical shaped engagement surfaces to facilitate alignment during installation.

Assembled fasteners having the structure described above provide an efficient method of installing them by either hand held or robotic installation tools. The method comprises the steps of providing outer dimensions on the cap nut 36 and drive nut 46 of each fastener which are constant for all of the fasteners, regardless of the different diameter of the stem 24 upon which they are mounted. The rotary wrench bit 40 and non-rotating fitting 50 are then successively moved onto and off the cap nut and drive nut of each fastener to install the fasteners without necessity to change the fitting and wrench bit each time a different size fastener is to be installed.

It will be appreciated from the foregoing that the present invention provides a blind fastener having wrench engaging surfaces of constant outer dimension, regardless of variations in the size of the fastener, to permit installation of different size fasteners without necessity to change wrench components of the installation tool. The invention further provides a convenient method for installing fasteners having different stem diameters without changing the tool wrench components.

While a particular form of the invention has been illustrated and described, it will be apparent that various modifications can be made without departing from the spirit and scope of the invention. Accordingly, it is not intended that the invention be limited, except as by the appended claims.

We claim:

1. A method of installing fasteners of the type having a fastener body, a drive nut in contact with the fastener body for restraining rotation thereof, and a threaded drive stem extending through a bore in the fastener body and a threaded bore in the drive nut, wherein the stem is rotated relative to the drive nut to install the fastener using an installation tool which engages the drive nut and the stem to cause relative rotation therebetween in the direction necessary to install the fastener, the method enabling setting fasteners having drive stems of different diameter without necessity to change the wrench bits of the installation tool, the method comprising the steps of:
   providing outer dimensions on the drive nuts which are constant for all the fasteners regardless of drive stem diameter;
   providing a first wrench bit on the installation tool which does not rotate relative to the tool and which can separately engage each drive nut by axial motion onto and off the drive nut to restrain it against rotation;
   fixedly mounting a cap nut on the outer end of the drive stem of each fastener to be set, the cap nuts having outer dimensions which are constant for all the fasteners regardless of drive stem diameter;
   providing a second wrench bit on the installation tool which rotates concentrically with respect to the first wrench bit but is spaced axially therefrom and which can engage the cap nut by axial motion onto and off the cap nut to rotate it; and
   successively moving the setting tool axially onto and off the cap nut and drive nut of each fastener to install the fasteners without changing the wrench bits.

2. The method of claim 1, wherein the outer dimensions of the drive nut and cap nut of each fastener comprise a cylindrical configuration, with the first and second wrench bits having a matching configuration for engagement therewith.

3. The method of claim 1, wherein the outer dimensions of the drive nut and cap nut of each fastener comprise a non-cylindrical configuration, with the first and second wrench bits having a matching configuration for engagement therewith.

4. The method of claim 1, wherein the outer dimensions of the drive nut of each fastener are greater than the outer dimensions of the cap nut.

5. A method of installing a fastener of the type having a fastener body, a drive nut in contact with the fastener body for restraining rotation thereof, and a threaded drive stem extending through a bore in the fastener body and a threaded bore in the drive nut, wherein the stem is rotated relative to the drive nut to install the fastener using an installation tool which engages the drive nut and the stem to cause relative rotation therebetween in the direction necessary to install the fastener, the method comprising the steps of:
   providing an outer configuration on the drive nut adapted to engage a first wrench bit on the installation tool which does not rotate relative to the tool and which can engage the drive nut by axial motion onto and off the drive nut to restrain it against rotation;
   fixedly mounting a cap nut on the outer end of the drive stem having an outer configuration adapted to engage a second wrench bit on the installation tool which rotates concentrically with respect to the first wrench bit but is axially spaced therefrom and which can engage the cap nut by axial motion onto and off the cap nut to rotate it; and
   successively moving the installation tool axially onto and off the cap nut and drive nut of the fastener to install the fastener in a workpiece.

6. The method of claim 5, wherein the outer configurations of the drive nut and cap nut are substantially the same, with the first and second wrench bits of the installation tool having a matching configuration for engagement therewith.

7. The method of claim 5, wherein the outer configurations of the drive nut and the cap nut are cylindrical.

8. The method of claim 5, wherein the outer configurations of the drive nut and the cap nut are non-cylindrical.

9. The method of claim 8, wherein the non-cylindrical configuration on the drive nut and the cap nut comprises a hexagonal configuration.

10. The method of claim 5, wherein the outer dimensions of the drive nut are greater than the outer dimensions of the cap nut.